United States Patent [19]

Sasaki et al.

[11] Patent Number: 4,920,529
[45] Date of Patent: Apr. 24, 1990

[54] NETWORK CONTROL METHOD AND APPARATUS THEREFOR

[75] Inventors: Ryoichi Sasaki, Fujisawa; Tsutomu Nakamura, Musashino; Michio Suzuki, Yokohama; Kohsuke Shinnai, Machida; Nobuhiko Ido, Yokohama; Tomoaki Tsunoda, Sagamihara, all of Japan

[73] Assignees: Hitachi, Ltd., Tokyo; Hitachi Micro Computer Engineering Ltd., Kodaira, both of Japan

[21] Appl. No.: 155,416

[22] Filed: Feb. 12, 1988

[30] Foreign Application Priority Data

Feb. 27, 1987 [JP] Japan .................................. 62-42676
Mar. 6, 1987 [JP] Japan .................................. 62-50030

[51] Int. Cl.$^5$ ............................................. H04L 11/08
[52] U.S. Cl. .......................................... 370/16; 370/17; 370/60
[58] Field of Search ................................... 370/14–17, 370/60, 94, 110.1; 371/11, 22

[56] References Cited

U.S. PATENT DOCUMENTS 4,679,189  7/1987  Olson et al. ............................ 370/60
4,745,593  5/1988  Stewart ................................. 370/60

Primary Examiner—Benedict V. Safourek
Assistant Examiner—Melvin Marcelo
Attorney, Agent, or Firm—Pennie & Edmonds

[57] ABSTRACT

A network management system prepares an optimum configuration table corresponding to a failure of a transit trunk and distributes the same to each TDM, and thereby the optimization of reconfiguration of a high-speed digital network is enabled.

User data are transmitted and received in accordance with route information table defined beforehand in each TDM. On the other hand, network management information is sent to all trunks other than a receiving trunk for the managing information when flooding is designated by the network management system. Accordingly, the management information can be sent without fail if any route to the TDM to be supplied with the management information exists. When source-routing is designated, the communications of the managing information can be implemented efficiently, since the route is set by the management information.

Moreover, each packet exchanger provides route identifiers defined individually for correspondence to local trunks, and transit route information set in each packet is recorded by using the route identifiers of each packet exchanger. Route information determined in the flooding process is then used in subsequent source-routed communications.

7 Claims, 13 Drawing Sheets

FIG. 6

| ROUTE NO. (ℓ) \ TRANSIT TRUNK (j) | A (j=1) 121 | B (j=2) 122 | C (j=3) 131 | D (j=4) 231 |
|---|---|---|---|---|
| 1 | 1 | 0 | 0 | 0 |
| 2 | 0 | 1 | 0 | 0 |
| 3 | 0 | 0 | 1 | 0 |
| 4 | 0 | 0 | 0 | 1 |
| 5 | 1 | 0 | 1 | 0 |
| 6 | 1 | 0 | 0 | 1 |
| 7 | 0 | 1 | 1 | 0 |
| 8 | 0 | 1 | 0 | 1 |
| 9 | 0 | 0 | 1 | 1 |

FIG. 7

| SUBSCRIBER CIRCUIT NO.(k) \ ROUTE NO. (ℓ) | 1 | 2 | 3 | 4 | 5 | 6 | 7 | 8 | 9 |
|---|---|---|---|---|---|---|---|---|---|
| 1 | 1 | 1 | 0 | 0 | 0 | 0 | 0 | 0 | 1 |
| 2 | 1 | 1 | 0 | 0 | 0 | 0 | 0 | 0 | 1 |
| 3 | 1 | 1 | 0 | 0 | 0 | 0 | 0 | 0 | 1 |
| 4 | 1 | 1 | 0 | 0 | 0 | 0 | 0 | 0 | 1 |
| 5 | 0 | 0 | 1 | 0 | 0 | 1 | 0 | 1 | 0 |
| 6 | 0 | 0 | 1 | 0 | 0 | 1 | 0 | 1 | 0 |
| 7 | 0 | 0 | 1 | 0 | 0 | 1 | 0 | 1 | 0 |
| 8 | 0 | 0 | 0 | 1 | 1 | 0 | 1 | 0 | 0 |
| 9 | 0 | 0 | 0 | 1 | 1 | 0 | 1 | 0 | 0 |
| 10 | 0 | 0 | 0 | 1 | 1 | 0 | 1 | 0 | 0 |

| 5 | | 6 | | ~23 |
|---|---|---|---|---|
| $S_1$ | 26 | $S_1$ | 27 | |
| $S_2$ | | $S_2$ | | |
| $S_3$ | | $S_3$ | | |
| $S_4$ | 13 | $S_4$ | | |
| $S_5$ | | $S_5$ | | |
| $S_6$ | | $S_6$ | 12 | |
| $S_7$ | | $S_7$ | | |
| $S_8$ | | $S_8$ | | |
| $S_9$ | | $S_9$ | | |
| $S_{10}$ | | $S_{10}$ | | |

| | |
|---|---|
| R1 | 1 |
| R2 | 2 |
| R3 | 3 |
| (R4) | (4) |
| — | — |
| — | — |

1611

| DESTINA-TION | 1 | 2 | 3 | 4 | 5 | 6 | 7 |
|---|---|---|---|---|---|---|---|
| 6 | 3 | 2 | 3 | 1 | 2 | 3 | — |
| | | | | | | | |
| | | | | | | | |
| | | | | | | | |

NETWORK CONTROL METHOD AND APPARATUS THEREFOR

BACKGROUND OF THE INVENTION

The present invention relates to configuration of an information network and a route control system, and particularly to a network control method and an apparatus therefor which are suitable for urgent reconfiguration of a high-speed digital network and transmission and reception of network management information in the case when any failure occurs in a high-speed digital trunk. In addition, it relates to an improvement in the route control system which is suitable for renewal of route control information at the time of alteration of the configuration of a packet interchange network.

As to a technique of switching over to another trunk or forming a roundabout trunk when a failure occurs in a trunk in the high-speed digital network, a report is made in "Non-stop Ultra-High Speed Multiplexer LINK/1", Masanori Shimagaki, Business Communication '84, Vol. 21, No. 8, pp. 74 and 75.

The high-speed digital network mentioned herein is a transfer network constructed with a time divisional Multiplexer (hereinafter referred to as TDM) provided as a central device. TDM subjects input signals from subscribe circuits (circuits of lower speed) to time divisional multiplexing and allots them to transmit trunks (high-speed trunks). In order to store the respective assignments of the subscriber circuits to the transmit trunks, a configuration table is incorporated in TDM. When a failure occurs in some transit trunk, it becomes necessary to alter the content of the configuration table and thereby to secure the communication between the subscriber circuits as much as possible by means of the switching of trunks, detours or the like. The preparation of a new configuration of a network by switching or detour in this way will be mentioned hereunder as reconfiguration of the network.

Regarding the managing system of a transfer apparatus such as TDM and the like, the functions of TDM LINK/1 of TIMEPLEX Company, described in the Business Communication '84, Vol. 21, No. 8, can be mentioned, for instance.

First problems of the above-stated prior art are as described below.

(1) Trunks used for switching or detour when a failure occurs in some transit trunk are not employed regularly, and they are often utilized only as stand-by trunks, which results in low efficiency of utilization thereof.

(2) When the trunks for switching or detour are used as regular trunks, there occurs a problem that important information flowing originally therethrough are lost. (3) So as to prevent the loss of important information, the configuration of a high-speed digital network after the occurrence of various failures must be determined in view of various factors, and it is difficult to obtain an optimum configuration by the trial-and-error methods adopted heretofore.

Although the details of managing systems are not specified in the above-stated prior art, it is clear that no consideration is given to the necessity that network management information should be sent to a destination node regardless of the network configuration adopted upon the failure of a trunk, for instance, unless the network is divided, and this causes a second problem in that the transmission and reception of the management information, which are necessary at the vary time of failure, can not be implemented in some cases.

An example in which a conventional method for acquiring the above-mentined transit route information by using source routing and broadcast is used for the control of inter-LAN (local area network) routes in a plurality of LANs connected by a bridge, is discussed in the following document.

Proceedings of IEEE, GLOBECOM, 1985, pp. 1019 to 1023

According to the above prior art, the transit route information is recorded using addresses not permitting overlap in a network given to the aforesaid trunks. However, no consideration is given therein to dispensing with the address management at the time of alteration of the network configuration as the extension, removal and shift of the network and the coupling of two networks, and this causes a third problem in that the alteration of addresses of either network is necessitated when two networks are coupled.

SUMMARY OF THE INVENTION

A first object of the present invention is to settle the above-stated first problem, furnishing a network control method and an apparatus therefor for reconfiguration of a high-speed digital network which is optimized when the occurrence of a failure in some transit trunk of the highspeed digital network is detected.

A second object of the present invention is to settle the above-stated second problem, furnishing a network control method and an apparatus therefor for enabling the transmission and reception in a network as far as a communication route with a destination node exists even when the network configuration is changed due to a failure or the like.

A third object of the present invention is to settle the above-stated third problem, furnishing a network control method and an apparatus therefor for facilitating the network management accompanying the alteration of the network configuration.

The aforesaid first object is attained by the following procedures.

(1) A network management system is provided in a high-speed digital network.

(2) Relative priorities are assigned to all pairs of subscriber circuits, and this information is inputted to the network management system.

(3) Presupposing the above-stated measures, the procedures are formulated as the questions of mathematical programming so that a configuration table enabling such communications as stated below can be prepared.

(a) Communications between the subscriber circuits given high priority are secured without fail even when a failure occurs. Communications between the subscriber circuits given low priority are secured also as much as possible.

(b) The number of TDMs whose configuration table is altered when a failure occurs is reduced as much as possible. This is because the communications between the subscriber circuits connected to TDMs are interrupted, though instantaneously, when the configuration table in said TDM is altered.

(4) The aforesaid questions of mathematical programming are solved in the network management system and a new network configuration table is prepared.

(5) The network configuration table thus prepared is distributed to TDMs from the network management system via the high-speed digital network or otherwise.

(6) When the distribution is completed, the configuration table to be used is altered, and communications are conducted on the basis of the new network configuration.

The aforesaid second object is attained in such a way that: in terms of the route control in TDMs, a route is controlled on the basis of route information defined beforehand with respect to user data, while all the routes to a target destination node is searched for by flooding with respect to network managing information.

In regard to the aforesaid first object, the reconfiguration of the high-speed digital network can be optimized by preparing the optimum configuration table to cope with a failure in transit trunks and by distributing same to each time divisional multiplexer (hereinafter abbreviated as TDM) by the network management system.

In regard to the aforesaid second object, user data are transmitted to and received from each TDM according to a route information table defined beforehand. As for the network managing information, on the other hand, either of the functions of flooding and source routing of TDMs having a function of multiplexed communication is selected in accordance with the specification of the network management system. In the case when the function of flooding is specified, the flooding function of each TDM makes it possible to search for all communication routes to destination TDMs, since transmission is made to all trunks other than the trunk receiving the management information according to this function. Therefore, the management information can be sent without fail as far as the route to the destination TDM the sent management information exists. In the case when the function of source routing is specified, the communication of the management information can be executed efficiently, since the route is set to this management information.

Moreover, the aforesaid third object is attained by providing a route identifier which is defined individually by each packet exchanger for dealing with a local trunk, and by recording a transit route information set in each packet, by using the route identifier of each packet exchanger.

Each packet exchanger defines the aforesaid sending route identifier individually irrespective of other packet exchange station. This sending route identifier is set by each packet exchanger on the occasion of acquisition of the transit route information by the above-mentioned broadcast, and after the transmit route information is determined, a route control is executed on the basis of it. Since each packet exchanger refers only to route information set locally and determines a sending route in accordance with the route identifier thereof, in this case, information (e.g. addresses or the like) of other stations are not needed, and accordingly the management thereof is dispensed with. Therefore, no alteration occurs in each exchanger even when any alteration, such as the extension, removal and shift of exchangers, occurs in an exchange network.

BRIEF DECRIPTION OF THE DRAWINGS

FIG. 6 is a table of correspondence of transit trunks with routes to be used;

FIG. 7 is a table of correspondence of subscriber circuit numbers with route numbers;

DETAILED DESCRIPTION OF THE PREFERRED EMBODIMENTS

Figure 1:
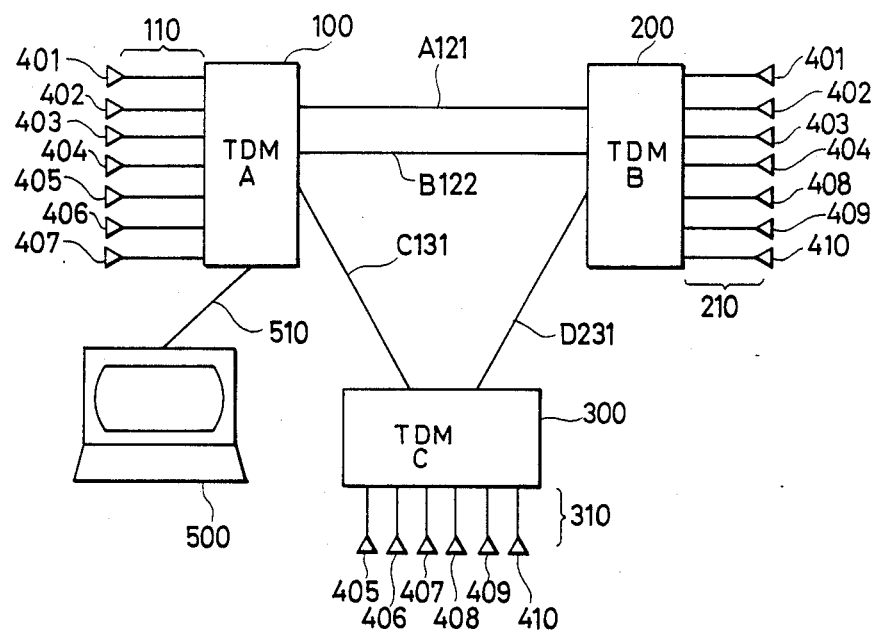
FIG. 1 shows one example of a configuration of a high-speed digital network.

A first embodiment of the present invention will be described with reference to FIGS. 1 to 7. FIG. 1 shows an example of a configuration of a high-speed digital network, in which seven subscriber circuits 110 and three transit trunks A121, B122 and C131 are connected to TDM A100. To the subscriber circuits 110, units 104, 402, 403, 404, 405, 406 and 407, such as a computer, a terminal and PBX, which necessitate communications are connected respectively.

Likewise, seven subscriber circuits 210 and three transmit trunks A121, B122 and D231 are connected to TDM B200, and units 401, 402, 403, 404, 408, 409 and 410 necessitating communications are connected to the subscriber circuits 210 respectively. Moreover, six subscriber circuits 310 and two transit trunks C131 and D231 are connected to TDM C300, and units 405, 406, 407, 408, 409 and 410 necessitating communications are connected to the subscriber circuits 310 respectively. In addition, a network management system 500 is connected to TDM A100 through a trunk 510.

Figure 2:
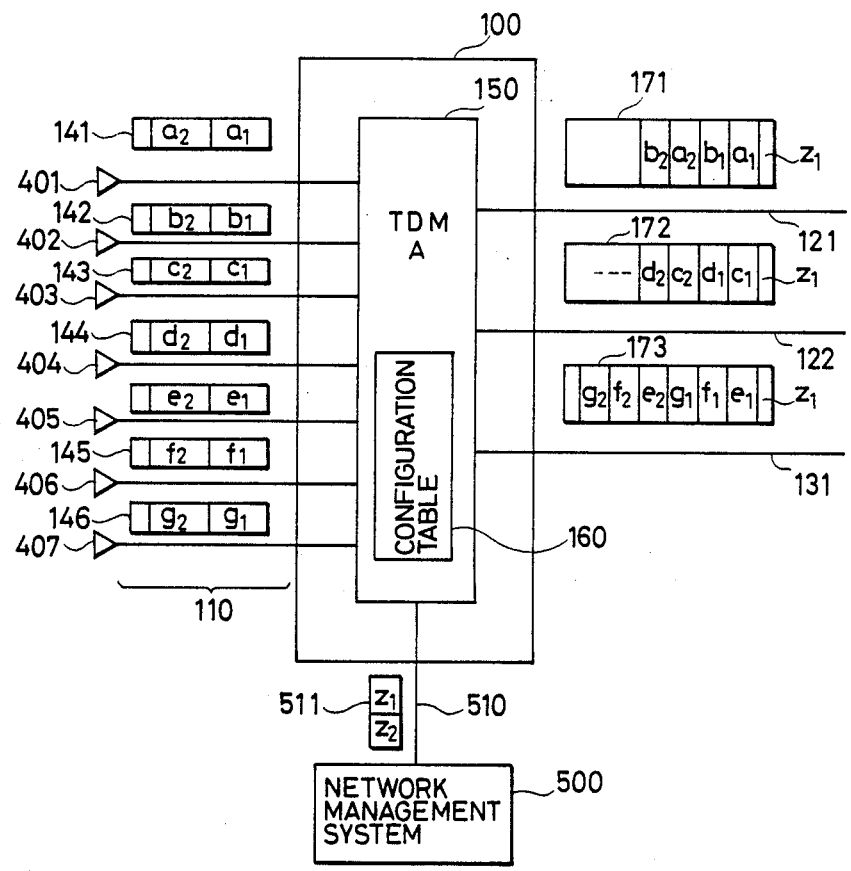
FIG. 2 shows the summary of processes of TDM.

FIG. 2 shows the summary of time divisional multiplexing in TDM A100. In TDM A100, TDM A150 is provided, and each subscriber circuit 110, the trunk 510 from the network management system 500 and the transmit trunks A121, B122 and C131 are connected thereto. The way in which information frames 141 to 146 and 511, sent through each subscriber circuit 110 and through the trunk 510 from the network management system 500, respectively are time division multiplexed and the assignment of these frames to the transit trunks 121, 122 and 131 are prescribed by a configuration table 160 in TDM A100. In the example of FIG. 2, the information frames 141 and 142 from the units 401 and 402 necessitating communications, as well as a management information frame 511, are time division multiplexed on an information frame 171 of the transit trunk A121 and transmitted to TDM B200 on the other side. The information frame 143 and 144 from the units 403 and 404 and the management information frame 511 are time division multiplexed, likewise, on an information frame 172 of the transit trunk B122. Information frames 145, 146 and 147 from the units 405, 406 and 407 and the management information frame 511 are similarly time division multiplexed on an information frame 173 sent over the transit trunk 131.

Time divisional multiplexing is conducted in the same way in other TDMs B200 and C300 as well.

The above description relates to the case of transmission. Actual trunks are of full duplex, and in the case of reception, an information frame sent through a transmit trunk is divided and assigned by the receiving TDM to a subscriber circuit under control of a network management system defined by the configuration table.

Next, procedures for reconfiguration of the network will be described on the basis of FIGS. 3 and 4.

(Step 1) Information on optimum network configurations for a normal time and a time of failure of a transit trunk is prepared by the network management system 500 by a method which will be described later.

(Step 2) Network reconfiguration information for separate faulty spots are distributed to each TDM through a management information network 600. The management information network 600 mentioned herein is a logic network configured by time division multiplexing the management information frame 511 on a transit trunk and by transmitting the same.

(Step 3) In each TDM, network configuration information employed in a normal time is stored in the form of configuration tables 160 and 260 on memories (called also operating sides) in TDMs A100 and B200. On the other hand, network (re)configuration information at the time of failure are stored in floppy disk drive units 180 and 280 connected to TDMs A100 and B200.

(Step 4) When the network management system 500 detects a failure and identifies a faulty trunk, network reconfiguration information corresponding to the trunk failure are loaded as the configuration tables 160 and 260 from the floppy disk driving units 180 and 280 onto the memories in TDMs A100 and B200 through signal lines 610 and 620 respectively.

The reconfiguration of the network is completed by the above-described procedures, and thereby operations can be executed under the condition that the relationship between a subscriber circuit and a transit trunk is different from that before reconfiguration. Although the description is made on the case of two TDMs, similar processes can be implemented in the case when TDMs are three or more.

For briefing, the network reconfiguration information is loaded on the memories of the operating sides directly from the disk driving units 180 and 280 in the above description. The information may be once set in another area (called also a preparatory side) on a memory and switched over from the preparatory side to the operating side according to an instruction from the network management system 500 after it is confirmed by the network management system 500 that the information is set on the preparatory side of all TDMs. Moreover, while the method wherein the network reconfiguration information is distributed beforehand is described above, another method may be adopted as well wherein a faulty trunk is identified by the network management system 500 and thereafter optimum network configuration information corresponding to the faulty spot is calculated and distributed to all TDMs.

Next, a method of optimizing network configuration will be described on the basis of FIG. 5.

The characteristic 561 of a subscriber circuit, the physical status 562 of the connection between the subscriber circuit and TDM, the physical status 563 of the connection between TDM and a transit trunk, and the characteristic 564 of the transit trunk, are inputted to a network reconfiguration optimization program in the network management system 500. Herein the characteristic 561 of a subscriber circuit includes circuit speed, priority of the subscriber circuit, etc. In the characteristic 564 of a transit trunk, circuit speed is included.

In the network reconfiguration optimization program 570, designation 572 of a failed trunk is conducted after a preprocessing step 571 is executed. Next, after the solution 573 of (problem P) which will be described later has been computed, the result is converted into a reconfiguration table in step 574. In a processing step 575, it is determined whether the above-stated processes are implemented for all trunks. Network reconfiguration information 580 for separate faulty trunks thus obtained is sent from the network management system 500 to TDMs A100 and B200 by the method mentioned in the description of FIG. 3.

The reason why priority is considered a significant characteristic 561 of a subscriber circuit in the above description is as follows. It is impossible to secure communications between all subscriber circuits even if network reconfiguration is implemented successfully, in the case when the total amount of communication of the subscriber circuits exceeds the total amount of communication facilities available through transit trunks on the occasion of occurrence of a failure. Therefore, a method of giving priority of three grades in the following way is adopted.

[Priority 1] A subscriber circuit for which communication is desired to be continued even when a failure occurs in a transit trunk which is in use at a normal time.

[Priority 2] A subscriber circuit for which communication is desired to be continued except for the case when a failure occurs in the transit trunk which is in use at a normal time.

[Priority 3] A subscriber circuit which is regarded as negligible, though reluctantly, for securing other subscriber circuits when a failure occurs.

Next, a method of formulating [problem P] will be described. In the formulation of [problem P], consideration is given so that the following functions can be obtained.

(1) Even when a failure occurs, communications between subscriber circuits having high priority must be secured without fail. Communications between subscriber circuit having low priority are also secured as much as possible.

(2) It is desirable to reduce the number of TDMs whose configuration table is altered on the occasion of occurrence of a failure. This is because communications between the subscriber circuits connected to a TDM are interrupted, though only momentarily when the configuration table in the TDM is replaced by the corresponding one used on the occasion of failure.

(3) The configuration table must not be so prepared that a subscriber circuit is connected directly to two or more transmit trunks at the same time.

(4) The capacity of each transit trunk is set beforehand (to be 1.5M bits/second, for instance), and it should be made impossible to assign more amount of communication between subscriber circuits than the capacity.

In the formulation implementing the considerations described above, a method is adopted wherein each set of transit trunks (one transit trunk is also allowable) through which some subscriber circuit is to be connected to a subscriber circuit paired with it, is defined as a route and the adoption or rejection of each route is formulated as a question of nonlinear binary (0-1) programming. The adoption and the rejection of each route is the 0-1 variable. Such a method of formulation as a question of optimization and automatic solution as described above is adopted because conventional manual adoption or rejection (1) fails to utilize some trunks efficiently, (2) tends to cause an error, and (3) requires much time. The result of formulation as a question of network reconfiguration optimization when a failure occurs in a designed transit trunk is as follows.

[Problem P]

$$\text{Maximize} \sum_{k=1}^{K} W_k \cdot S_k \cdot \sum_{l=1}^{L} x_{kl} - \phi \sum_{k=1}^{K} \sum_{l=1}^{L} (\bar{x}_{kl} - x_{kl})^2 \quad (1)$$

$$\text{subject to} \sum_{l=1}^{L} x_{kl} \leq 1 \quad (k = 1, 2, \ldots, k) \quad (2)$$

$$(1 - a_{kl}) x_{kl} = 0 (k = 1, 2, \ldots, K; l = 1, 2, \ldots, L) \quad (3)$$

$$\sum_{k=1}^{K} S_k \sum_{l=1}^{L} b_{je} \cdot x_{kl} \leq H_j \cdot \rho_j (j = 1, 2, \ldots, j) \quad (4)$$

$$x_{kl} = 0 \text{ or } 1$$

$$(k = 1, 2, \ldots, K; l = 1, 2, \ldots, L)$$

In the above expressions, signs have the following meanings.

k: the number of a subscriber circuit. One number is given in a pair. In the example of FIG. 1, a subscriber circuit connected to the unit 401 is made to correspond to k=1, a subscriber circuit connected to the unit 402 to k=2, and in this way, correspondence is made down to k=10.

K: the total number of subscriber circuits. K=20 in the example of FIG. 1.

$W_k$: A value given by enabling the implementation of the communication between k-th subscriber circuits. This value is set automatically according to the priority of the subscriber circuits given by an input. For instance, 10,000 is set for Priority 1, 100 to Priority 2, and 1 to Priority 3.

$S_k$: The speed (Kbits/second) of the k-th subscriber circuits.

l: This value is input, and denotes the l-th route out of ones consisting of sets of transit trunks connecting between TDMs. Trunks having a cycle (i.e. passing the same TDM twice or more) are not included. In the example of FIG. 1, the transit trunk A121, the transit trunk B122 and the transit trunks C131 to D231 are the routes connecting between TDMs A100 and B200. The relationship between the routes and the transit trunks employed is as shown in FIG. 6.

L: the total number of routes. L=9 in the example of FIG. 1.

j: the number of a transit trunk. In the example of FIG. 1, the transit trunk A121 is numbered as j=1, B122 as j=2, C131 as j=3, and D231 as j=4.

J: the total number of transit trunks. In the example of FIG. 1, J=4.

$$x_{kl} = \begin{cases} 1: & \text{The } k\text{-th subscriber circuits may be assigned to the route of an address } l \text{ if condition that a failure occurs in a designated transit trunk.} \\ 0: & \text{They will not be assigned to said route.} \end{cases}$$

$\bar{x}_{kl}$: The permissible assignment of the k-th subscriber circuit to the route of address 1 in normal conditions. The definitions of $\bar{x}_{kl}=1$ and 0 are identical with those of $x_{kl}$.

$\phi$: This is a coefficient representing the relative importance of the index of the first term of the expression (1) to that of the second term thereof, and it can be set freely. As the value of $\phi$ becomes larger, the more importance is given to the index of the second term. The first term represents an operation of assigning each subscriber circuit to a route so that a value becomes maximum, while the second term represents an operation of minimizing the difference from the route in a normal time and also minimizing the TDMs whose configuration tables are altered.

$a_{kl}$: This is a sign denoting whether the k-th subscriber circuit can be assigned to the route of the address 1 or not, and it is given by an input. The routes to which the subscriber circuits can be assigned are limited to those which start from and end in a TDM to which the subscriber circuits are connected. In the example of FIG. 1, a table of values of $a_{kl}$ showing the correspondence between each subscriber circuit and the route connectable thereto is shown in FIG. 7. It can be seen from this figure that route Nos. to which the subscriber circuit No. 1 is connectable are 1, 2 and 9 ant that $a_{11}=1$, $a_{12}=1$, $a_{13}=0$, $a_{14}=0$, $a_{15}=0$, $a_{16}=0$, $a_{17}=0$, $a_{18}=0$, $a_{19}=1$, etc.

$b_{jl}$: This is a sign denoting whether the l-th route passes through a j-th transit trunk, and it is given by an input. The route passes through the transit trunk when b=1, and does not pass therethrough when $b_{jl}=0$. A able of the value of $b_{jl}$ in the example of FIG. 1 is shown in FIG. 6.

$H_j$: the speed (Kbits/second) of a transit trunk j.

$p_j$: a sign denoting whether the transit trunk j is normal or not. If $p_j=0$, the function thereof is normal, and if $p_j=1$, the transit trunk has a failure and is not in the state that it allows communications. A faulty state of the trunk can be simulated by setting the value of $p_j$ to be 0 sequentially.

The meanings of the restrictive conditions of expressions (2) to (4) are as follows.

Expression (2): This represents the restriction that the route assignable to each subscriber circuit is 1 or less. When the left member of the expression (2) is 0 in regard to some subscriber circuit k, it means that no route can be assigned to the subscriber circuit and that communications by using said subscriber circuit can not be effected.

Expression (3): This represents the restriction that the route to which a subscriber circuit can be assigned is limited to the one which starts from and ends in TDM to which the subscriber circuit is connected.

Expression (4): This represents the restriction that the amount of communication which can be assigned to a transit trunk can not exceed a set capacity and that the capacity of the trunk must be 0 at the time of failure thereof.

The description of problem P will be ended here.

Next, the solution of [problem P] will be described. Problem P is called a question of nonlinear 0-1 programming in the field of an optimization technique. This solution can be implemented efficiently by using a branch-and-bound technique ("Mathematical Programming", Yasuji Sekine, Iwanami Shoten, 1981) or the like, and thereby an optimum value of $x_{kl}$ ca be found.

Figure 3:
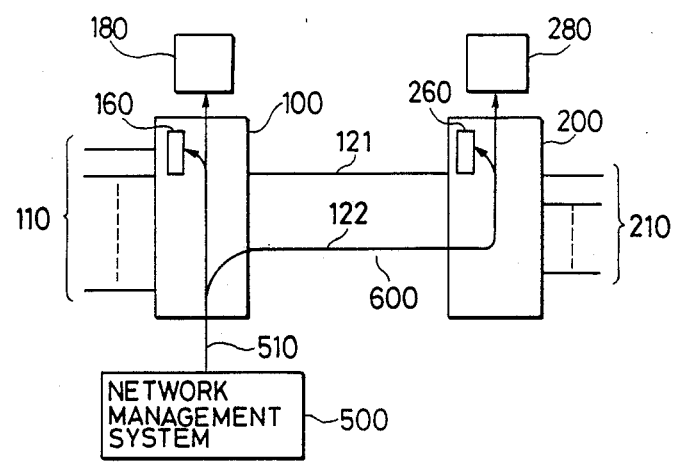
FIG. 3 shows a method of distribution of a configuration table for reconfiguration of the network.
Figure 4:
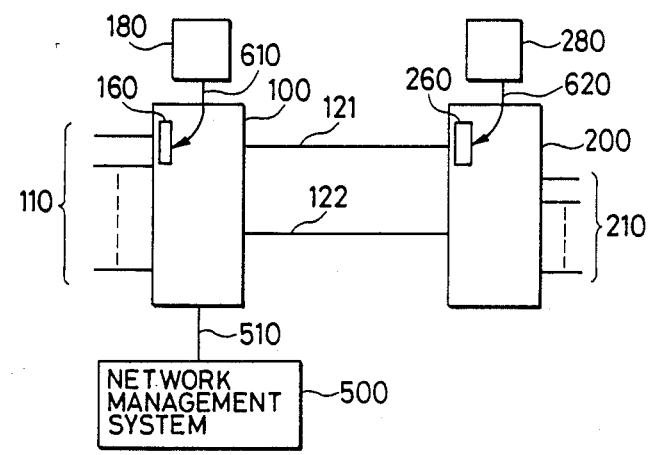
FIG. 4 shows the alteration of the configuration table at the time of occurrence of a failure.
Figure 5:
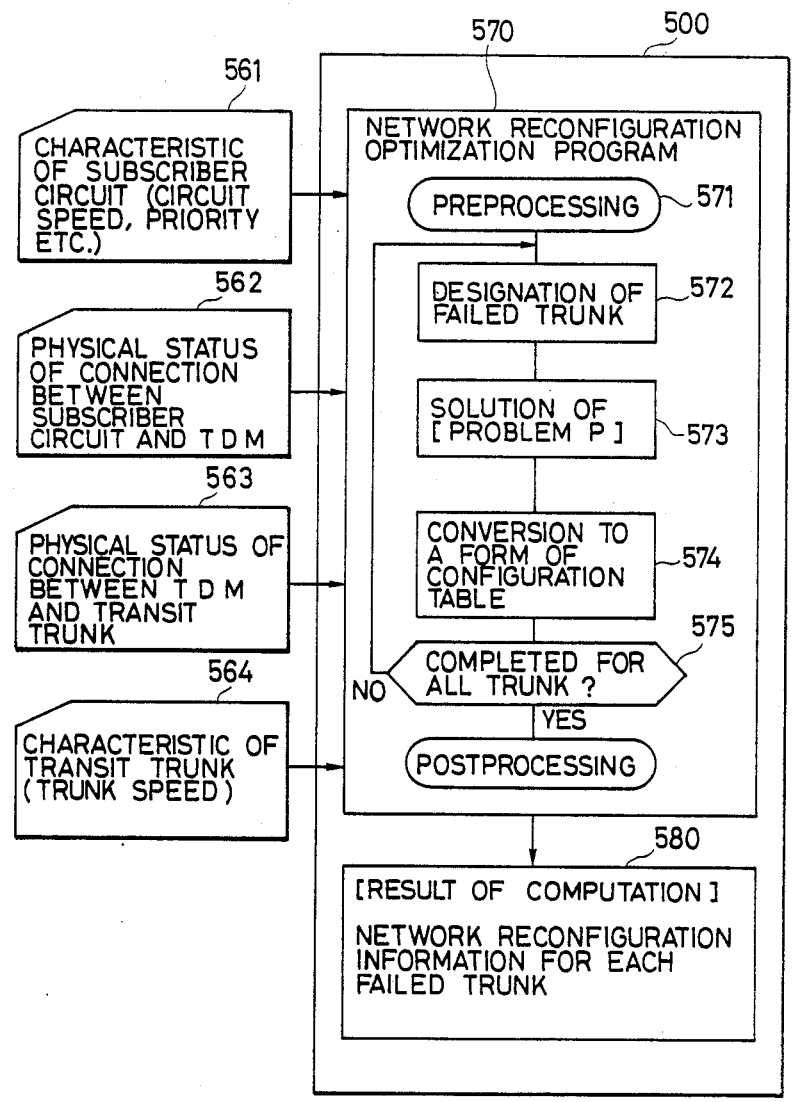
FIG. 5 shows a method of optimizing the reconfiguration of the network.

Since the formulation and the method of solution of problem P are made apparent by the above, network reconfiguration information for separate faulty trunks can be obtained by the procedures of FIG. 5, and the switching over to an optimum network configuration on the occasion of failure can be implemented by the method mentioned in relation to FIGS. 3 and 4.

While the method of classifying the priority into three grades is adopted in the foregoing description, it is also possible to classify it into two or four or more grades.

Moreover, while the second term representing a norm is expressed as $$\phi \sum_{k=1}^{k} \sum_{l=1}^{L} (\bar{x}_{kl} - x_{kl})^2$$

another norm such as $$\phi \sum_{k+1}^{k} \sum_{l=1}^{L} |\bar{x}_{kl} - x_{kl}|$$

can be used as well.

Besides, as stated previously, not only the failure of transit trunks, but also the failure of TDM, can be coped with likewise, by treating failure of a TDM as if a failure had occurred in all the transit trunks connected to said TDM.

Figure 8:
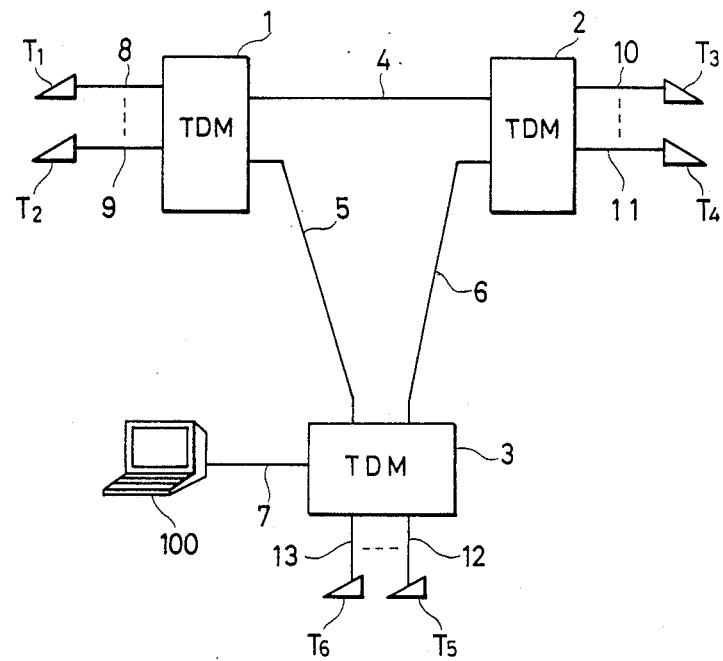
FIG. 8 shows an example of a configuration of a network to which a network managing information control system of the present invention is applied.

Next, a second embodiment of the present invention will be described by using FIGS. 8 to 14. FIG. 8 shows an example of a configuration of a network realizing the present invention, which comprises TDMs 1 to 3, transit trunks 4 to 6 (e.g. high-speed digital trunks furnished by Nippon Telegraph & Telephone Co., Ltd.), terminals $T_1$ to $T_6$ which conduct communications with one another by using the network (hereinafter referred to as a high-speed digital network) composed of the aforesaid TDMs and transit trunks, a managment system 100 which interchanges failure information and the like with the aforesaid TDMs and manages the aforesaid high-speed digital network based thereon, and subscriber circuits 7 to 13. In FIG. 8, DSU (data service unit) in the terminal device of a high-speed digital trunk, a modem on the subscriber circuit side, etc. are omitted since they have no direct relation with the present invention. The terminals are mentioned only in necessary numbers.

Figures 9, 10:
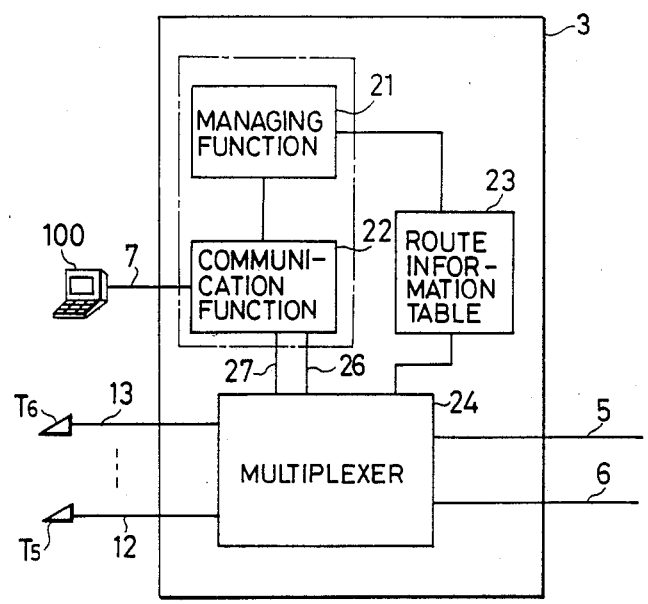
FIG. 9 shows one example of a configuration of TDM of the present invention.
FIG. 10 shows an example of a configuration of a route information table in TDM.

FIG. 9 shows a configuration of TDM 3, which comprises a managing function 21, a communicating function 22, a multiplexer 24 which multiplexes the data from subscriber circuits 12 and 13 on transit trunks 5 and 6 and, demultiplexes the data from the transit trunks 5 and 6 to transmit the same to the subscriber circuits 12 and 13, and a configuration table 23 which is referred to when said multiplexer 24 executes multiplexing/demultiplexing. TDMs 4 and 5 (FIG. 8) have the same configuration as those in FIG. 9. The communicating function 22 is a feature of the present invention, and it has a function of packet exchange which fulfills the exchange of management information between the network management system 100 and the respective managing functions of the TDMs provided therein.

Figure 11:
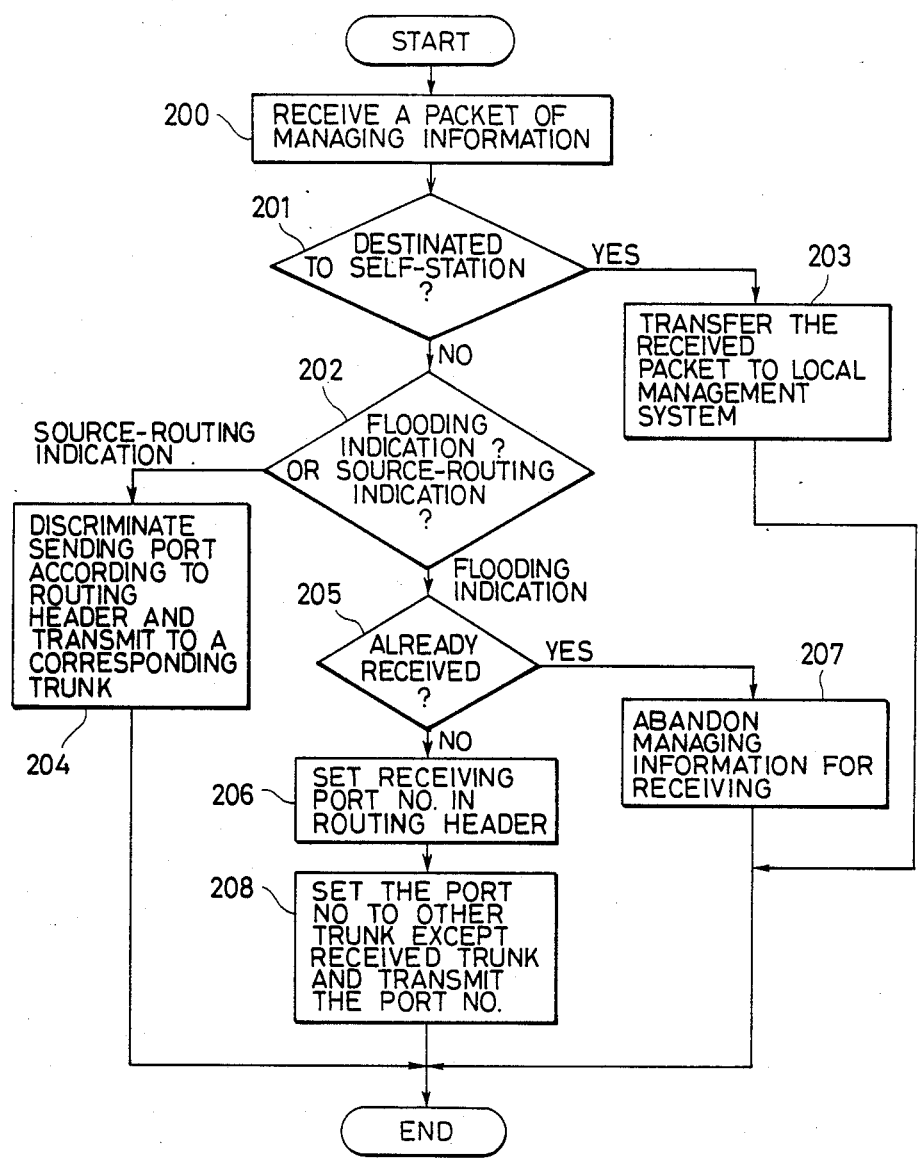
FIG. 11 is a schematic flowchart of processing procedures of a communicating function which realize the present invention.

FIG. 10 shows the content of the configuration table 23, illustrating that the data of the subscriber circuits 12 and 13 and those of trunks 26 and 27 from the communication function 22 are made to correspond to the respective time slots of the transit trunks 5 and 6. Next, the summary of processing procedures of the communicating function 22 realizing the present invention is shown in the flowchart of FIG. 11. Systems of flooding and source-routing in the case when a TDM having a communicating function implements the processing steps shown in FIG. 11 takes a network configuration, are described in "Proceedings of IEEE, GLOBECOM 1985, pp. 1019 to 1023, and therefore the details thereof are omitted herein. These functions of flooding and source-routing are controlled by the network management system 100, for instance. The above is the description of the components employed for realizing the present invention, and next, the operations of these components will be described by using a concrete example.

Figure 12:
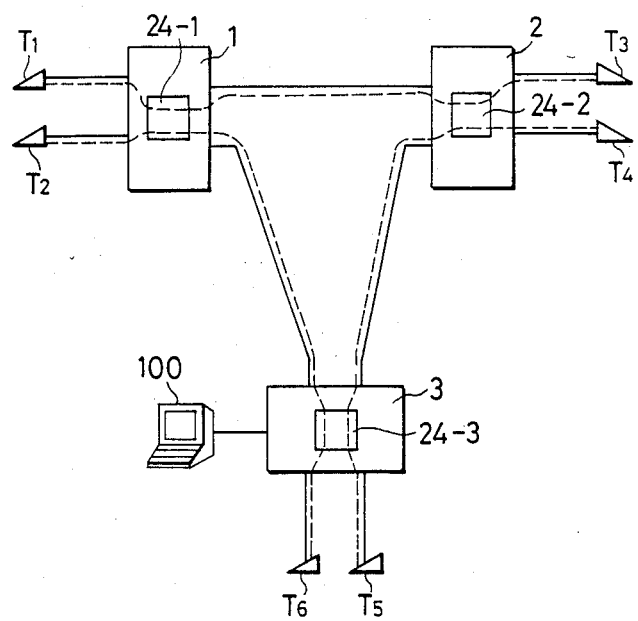
FIG. 12 shows an example of communications among subscriber terminals.

When communications are conducted between terminals $T_1$ and $T_3$, $T_2$ and $T_6$, and $T_4$ and $T_5$, the correspondence between the subscriber circuits and the time slots of frames in the transit trunks are defined in the configuration table of each TDM, and the communications are effected by a multiplexer. This example is illustrated in FIG. 12. Herein, dotted lines indicate the flows of data among the terminals $T_1$ to $T_6$. In this case, the communications are conducted by using routes which are set in the configuration table 23 and defined beforehand.

In the state in which data is transferred between terminals as described above, the network management system 100 operates in the following way, for instance, when it transmits management information to TDM 2 and receives the same therefrom. First, the network management system transmits to TDM 3 a managing information packet whose destination address is set in TDM 2.

FIG. 11 is a flowchart showing the processing procedures of the communicating function which realizes the present invention. In FIG. 11, the communicating function receives a packet of management information from a sub-channel in a block 200, and determines, in a block 201, whether or not said received packet of management information is destined for a local node. If the packet is destined for a local station, it is transmitted (block 203) to the managing function of the local node, and thereby the processing is ended. When it is determined in the block 201 that the destination is not the local node, it is determined further in a block 202 which of flooding and source-routing is indicated. If flooding is indicated, it is determined in a block 205, by using a sequence number, for instance, whether said received packet of management information has been already received, and if already received, said packet of managing information is abandoned in a block 207. If the reception is the current one, a receiving port number is set in a prescribed routing header of said received packet in a block 206, while a sending port number is set therein in a block 208, and transmission is conducted. When it is determined in the block 202 that source-routing is indicated, on the other hand, a sending port is found from the routing header in a block 204, and transmission is made therefrom to a corresponding trunk.

Figure 13:
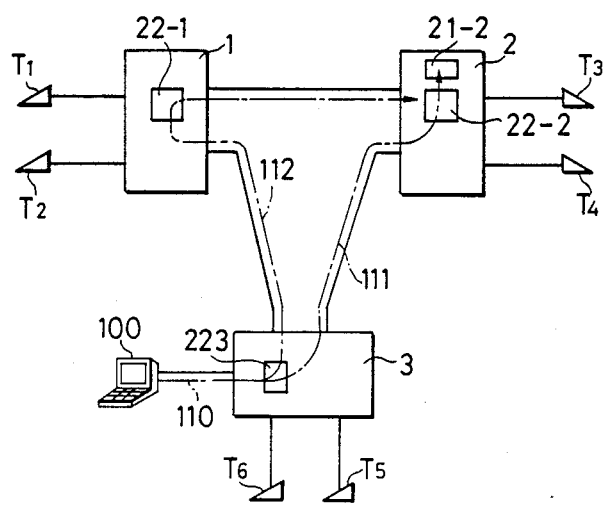
FIG. 13 is a flowchart showing flows on the occasion when a network managing information is specified for flooding.

When transmission of the packet occurs, the packet is sent from the communicating function 22 to both trunks 26 and 27 and is then sent from the multiplexer 24 by using corresponding slots of the transit trunks 5 and 6. The management information packet sent to both of the transit trunks 5 and 6 is sent to the communicating functions of TDMs 1 and 2 in the same way and is processed thereat. As the result, the management information packet sent from the network management system 100 to TDM 2 is transmitted as shown in FIG. 13. In other words, it is transmitted by two routes 111 and 112. However, the management information packet sent through the route 112 is abandoned in a communicating function 22-2. (Refer to Step 207 of FIG. 11) Meanwhile, the management information packet sent by route 111 is transferred to a managing function 21-2, providing information according to which the route through which the packet is transmitted is set, and when the managing function 21-2 sends data to the network management system 100, it can send the same through a backward route by using the route information thus obtained (source-routing). As the result, in addition, the network management system 100 can also obtain the information on the route to TDM 2 and thereafter can conduct transmission and reception of a management information with TDM 2 by source-routing indication. Having obtained routing information, however, the network management system 100 may also conduct the transmission and reception of the management information with each TDM by flooding, i.e., as the packets were originally sent in the example above.

In the present invention, as described above, data communications among ordinary terminals $T_1$ to $T_6$ are conducted by the routing information (defined by the configuration table) set beforehand, and flooding/source-routing is conducted when the network management system interchanges management information with a network configuring apparatus.

Next, a description will be made on the failure-proof property of management information in relation to failure of trunks and the like, which is one of the effects of the present invention.

Figure 14:
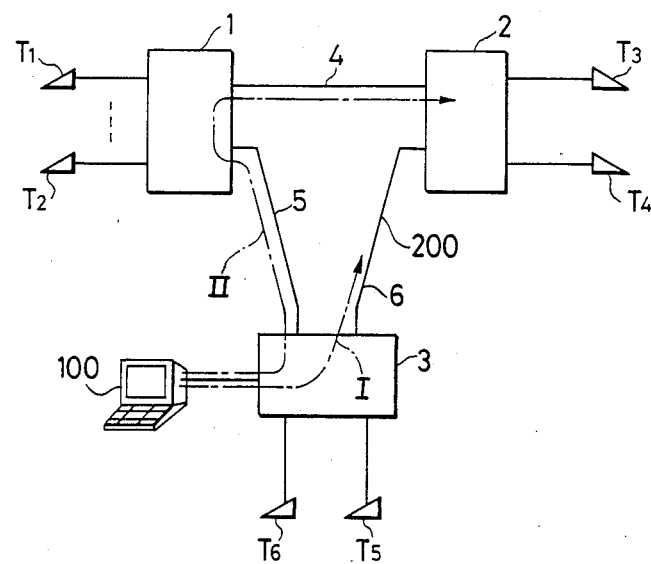
FIG. 14 shows flows of the managing information on the occasion when a failure occurs in a trunk.

FIG. 14 shows the case when a failure 200 occurs in the transit trunk 6. In this case, management data which the network management system 100 has sent to TDM 2 using the route obtained in the description of FIG. 13 (route 1) fails to arrive at the destination. By making a flooding transmission the network management system 100 can obtain a new route 11 again. However, the data sent between terminals $T_4$ and $T_5$ are affected by the failure of route 1.

According to the present embodiment, as described above, network management information can be transmitted and received even in the failure of network trunks and the like by enabling the dynamic alteration of a route by means of flooding/source-routing, while the data in general user terminals are routed in conformity with a table set beforehand. This produces a network management system having a high failure-proof property.

Lastly, a third embodiment of the present invention will be described on the basis of FIGS. 15 to 20.

Figure 15:
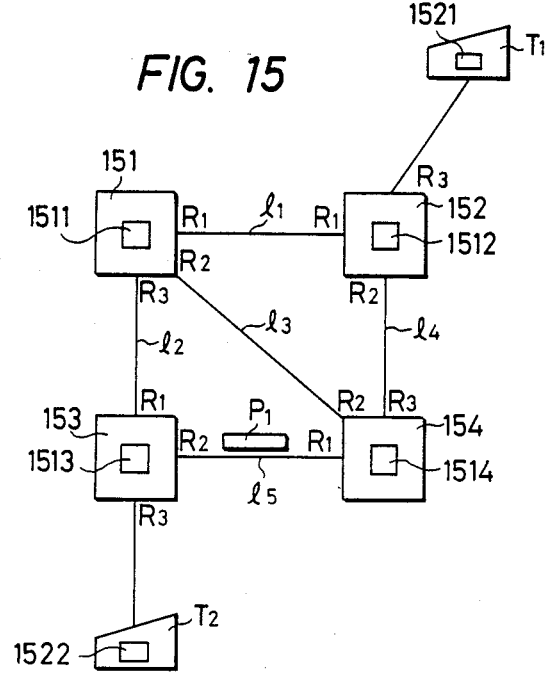
FIG. 15 shows one example of a configuration of a packet exchange network which is an embodiment of the present invention.

FIG. 15 shows a configuration of a packet exchange network based on the present invention.

Figures 16, 17, 18:
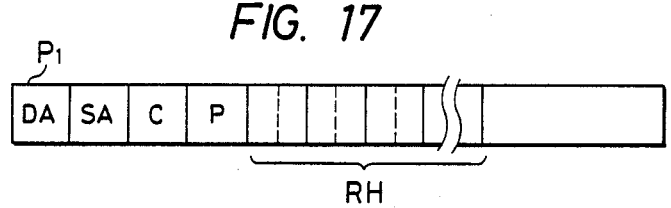
FIG. 16 is a table of correspondence of routes with route identifiers of a packet exchanger.
FIG. 17 shows an example of a configuration of a packet.
FIG. 18 shows an example of a configuration of a transit route information table which a packet terminal has.
Figure 19:
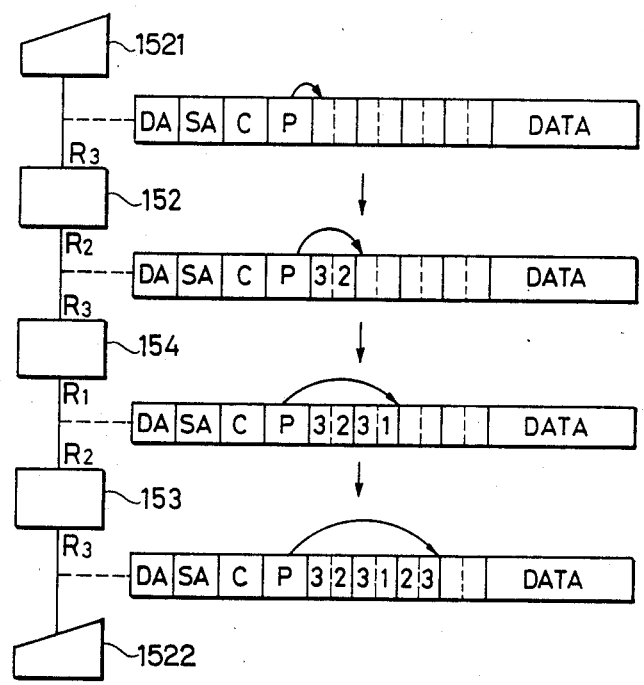
FIG. 19 illustrates the acquistion of a transit route information.

This packet exchange network comprises packet exchangers 151 to 154, packet terminals $T_1$ and $T_2$, trunks $l_1$ to $l_5$, a packet $P_1$, tables 1511 to 1514 which contain information relating sending routes to route invention, which the packet exchangers have respectively, and tables 1521 and 1522 of information on transit routes to destination terminals, which the packet terminals have. Besides, a route recognized by each packet exchanger is denoted by $R_k$ (k: 1, 2, 3). FIG. 16 shows an example of the table 1511 of correspondence of sending routes with route identifiers thereof, and FIG. 17 shows an example of a configuration of the packet $P_1$, which comprises a destination terminal address DA, a sending terminal address SA, a control element C, a transit route information element RH and a pointer P. FIG. 18 shows an example of a detailed configuration of the table 1521 of transit route information which each packet terminal has. Herein $R_1$, $R_2$, $R_3$, etc. denote physical communication ports being present in trunk correspondence in each exchanger. Moreover, FIG. 19 shows a state wherein a packet sent from a packet terminal 195 to a packet terminal 196 acquires transit route information gradually in the present invention. In FIG. 19, however, a header and a trailer normally also used in data link control coding between nodes are omitted.

A process of acquisition of transit route information will be described hereunder by using FIG. 19. A packet terminal 1521 executes broadcaster designation (by turning ON a broadcast designation bit in the control element C: the inner structure of the control element C is omitted in the present embodiment). Then, it sends the same to the packet exchanger 152. The packet exchanger 152 sets a route identifier 3 corresponding to a receiving route in an area pointed by the pointer P in the packet, and sends same to a route R1 and a route R2. On the occasion, a route identifier 1 is set for the packet sent to the route R1, while a route identifier 2 is set for the packet sent to the route R2. In other words, the receiving route and the sending route between each pair oof modes are set in a pair. Besides, the value of the pointer P is incremented by 1 on the occasion. FIG. 19 shows the case of transmission to the route R2. The same processing as above are executed in the packet exchanges 154 and 153, and the transit route information as shown in FIG. 19 has been set when the packet arrives at a packet terminal 1522. Accordingly, the packet terminal 1522 acquires information on the transit route to the receiving terminal 1521 by receiving said packet, and the terminal 1521 also acquires information on the transit route to the terminal 1522 by the terminal 1522 transmitting the packet reversely to the sending terminal 1521 by using the aforesaid information on the transit route. Besides, on the occasion when the packet is sent from the terminal 1522 to the terminal 1521, the sending is made in accordance with transit route information designation (provided in the control element C, but omitted in the present embodiment), and thereby each packet exchanger can send the packet to the terminal 1521 by conducting a route control according to the route identifier specified by the pointer. Thus the route taken by a first message between two packet terminals, which is originally not defined, is used in transmission of further messages between the two terminals.

Figure 20:
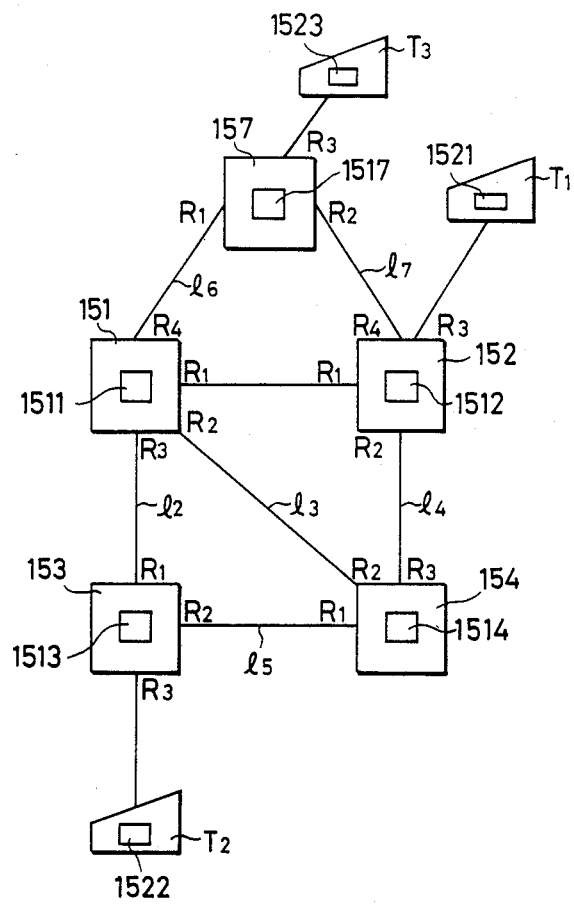
FIG. 20 shows an example of a configuration in the case of extension in the packet exchange network of the present invention.

FIG. 20 shows a case where a network is extended with regard to the network configuration of FIG. 15 in the packet exchange network realizing the present invention. In this case, exchangers 151 and 152 located adjacently to an exchanger 157 provided in extension may use tables of correspondence of routes R4 with route identifiers thereof defined beforehand, and the exchanger 157 alone is required to define afresh a table of correspondence of local routes $R_1$, $R_2$ and $R_3$ with route identifiers thereof. Besides, information on transit routes between a terminal T3 and existing terminals T1 and T2 can be prepared in the same way as in the case of the information on a transit route between T1 and T2.

As is apparent from the above description, the route identifier has no relation with a trunk number and a number of an adjacent apparatus (the packet exchanger or the packet terminal). In addition, the route identifier can be set as a number of a physical communication port of a trunk of a route, for instance.

As described above, the present embodiment has an effect that the packet exchange network can be extended without affecting existing packet exchangers.

According to the present invention, it is possible to calculate an optimum network reconfiguration on the occasion of occurrence of a failure in a high-speed digital trunk and to distribute same to the TDMs in the network management system. When any failure occurs in a trunk, therefore, switching can be made automatically and at high speed over to a configuration of a network which (a) secures the communications between subscriber circuits of high priority without fail, (b) secures also the communications between subscriber circuits of low priority as much as possible, and moreover (c) minimizes the subscriber circuits which fail to communicate even momentarily.

According to the present invention, the transmission and reception of network management information can be implemented between the network management system and the TDMs, an object of management thereby, as far as a communication route exists. Therefore the transmission and reception of the network management information is enabled even when the configuration of the network changes due to the failure of a trunk and the like, and thus a network management system highly resistant to failure can be constructed. According to the present invention, moreover, operation intervention for management of configuration of a packet exchange network, allotment of addresses, etc. is dispensed with and consequently labor-savings can be attained in initial configuration of said network and in any subsequent extension, removal and shift of exchanging stations, since it is unnecessary to recognize the mutual relationship in connection of exchangers, the numbers of transit trunks, etc.

We claim:

1. In a system comprising a TDM network, comprising a plurality of TDMs each comprising means for multiplexing data from subscriber circuits for communication and means for managing a local station, and communicating trunks connecting said TDMs mutually, and a network management system executing management of the network by interchanging management information through the means for managing of each TDM, a network control method wherein the aforesaid communicating trunks are divided into main communicating channels for interchanging user data and subordinate communicating channels for interchanging management information, and wherein communications of user data are executed by using the main communicating channels in accordance with a fixed routing table set before-hand, while communications of the management information are executed by using one of flooding and source-routing functions, selected in accordance with the state of the aforesaid TDM network.

2. In a system comprising a TDM network comprising of plurality of TDMs each comprising means for multiplexing data from subscriber circuits for communication and means for managing a local station, communications trunks connecting said TDMs mutually, and a network management system executing management of the network by interchanging management information through the means for managing of each TDM, a network control apparatus comprising means to divide the aforesaid communicating trunks into main communicating channels for interchanging user data and subordinate communicating channels for interchanging managing information, a routing table storing means for providing communication of the user data using the main communicating channels, wherein routing means having a flooding function and a source-routing function is provided in each TDM, and a selecting means is provided to select one of said flooding and source-routing functions in accordance with the state of the aforesaid TDM network so as to provide communication of the management information, using the aforesaid subordinate communicating channels.

3. A control method for reconfiguration of a network comprising a plurality of TDMs, each comprising a memory to store connection relationships between subscriber circuits connected to said TDMs and trunk circuits connecting said TDMs to each other, one of said TDMs being connected to a network controller which stores first parameters characteristic of said trunk circuits and second parameters characteristic of said subscriber circuits, said control method comprising the steps of:
detecting a failure in one or more of said trunk circuits;
calculating evaluation indexes responsive to the first parameters, the second parameters and physical status information relating to said trunk circuit in which said failure has occurred;
determining network configuration data to be supplied to said TDMs on the basis of said evaluation indexes; and
distributing frames having said network reconfiguration data from said network controller to each of said TDMs so that each TDM changes the relationships in its memory according to the distributed reconfiguration data.

4. The method of claim 3 wherein said steps of calculating evaluation indexes, determining network reconfiguration data and distributing frames are performed by said network controller.

5. In a packet exchange system which comprises a plurality of packet exchangers and packet terminals connected by trunk circuits, wherein a sending terminal inserts route information in a route information field of a transmitted packet to show the route to a destination terminal, and wherein said packet exchangers relay received packets to output routes connected thereto on the basis of the route information contained in said received packets, a control method comprising the steps of:
generating a broadcast packet for finding a route to a destination terminal by inserting broadcast data in a transmitted packet, when a sending terminal detects a failure in one of the trunk circuits;
sending out said broadcast packet from said sending terminal to a packet exchanger connected directly to said sending terminal;
when any of said packet exchangers receives said broadcast packet, operating each of said packet exchangers to resend copies of said broadcast packet to all possible output routes by adding a pair of route identifiers, each pair representing a receiving route and a output route pertinent to the resnding packet exchanger, in the route information field of the resent copies of the broadcast packet;
when the destination terminal receives a broadcast packet which contains the address of said destination terminal, operating said destination terminal to generate a responding packet which includes route information corresponding to the route information in the received packet and returning said responding packet to said sending terminal; and
when said sending terminal receives said responding packet, storing said route information included in said responding packet, to use said stored route information in thereafter sending further packets from said sending terminal to said destination terminal.

6. A control system for reconfiguration of a network comprising a plurality of TDMs, each comprising a memory to store connection relationships between subscriber circuits connected to said TDMs and trunk circuits connecting said TDMs to each other, one of said TDMs being connected to a network controller which stores first parameters characteristic of said trunk circuits and second parameters characteristic of said subscriber circuits, said network controller comprising: means for detecting a failure in one or more of said trunk circuits;
means for calculating evaluation indexes responsive to said first parameters, said second parameters and physical status information responsive to the trunk circuit(s) in which said failure has occurred;
means for determining network reconfiguration data to be supplied to each of the TDMs on the basis of said evaluation indexes;
and means for distributing frames including said network reconfiguration data from said network controller to each of the TDMs so that each of the TDMs changes the connecting relationships stored in its memory according to the distributed reconfiguration data.

7. In a packet exchange system which comprises a plurality of packet exchangers and packet terminals connected thereby by trunk lines, wherein, when a sending terminal sends a packet to be transmitted to a destination terminal via one or more packet exchanger(s), the sending terminal inserts route information in the packet to be transmitted, and said packet exchanger sends said packet to said destination terminal responsive to said route information, a network control system comprising:
means for generating a broadcast packet by inserting broadcasting data in a transmitted packet when said sending terminal detects a failure in a trunk circuit connecting said packet exchangers;
means for transmitting said broadcast packet to a packet exchanger connected directly to said sending terminal;
means for operating each packet exchanger to insert a pair of route identifiers, identifying the receiving route and the sending route pertinent to that packet exchanger as a part of the route information inserted in said broadcast packet, and to transmit said broadcast packet over all routes connected thereto except the route by which the broadcast packet was received;
means for operating said destination terminal to store the route information contained in the broadcast packet when received in a memory of said destination terminal, and to generate a responding packet including said route information and returning said responding packet to said sending terminal; and
means in the sending terminal for storing said route information comprised by said responding packet and for using said route information thereafter.

* * * * *